UNITED STATES PATENT OFFICE.

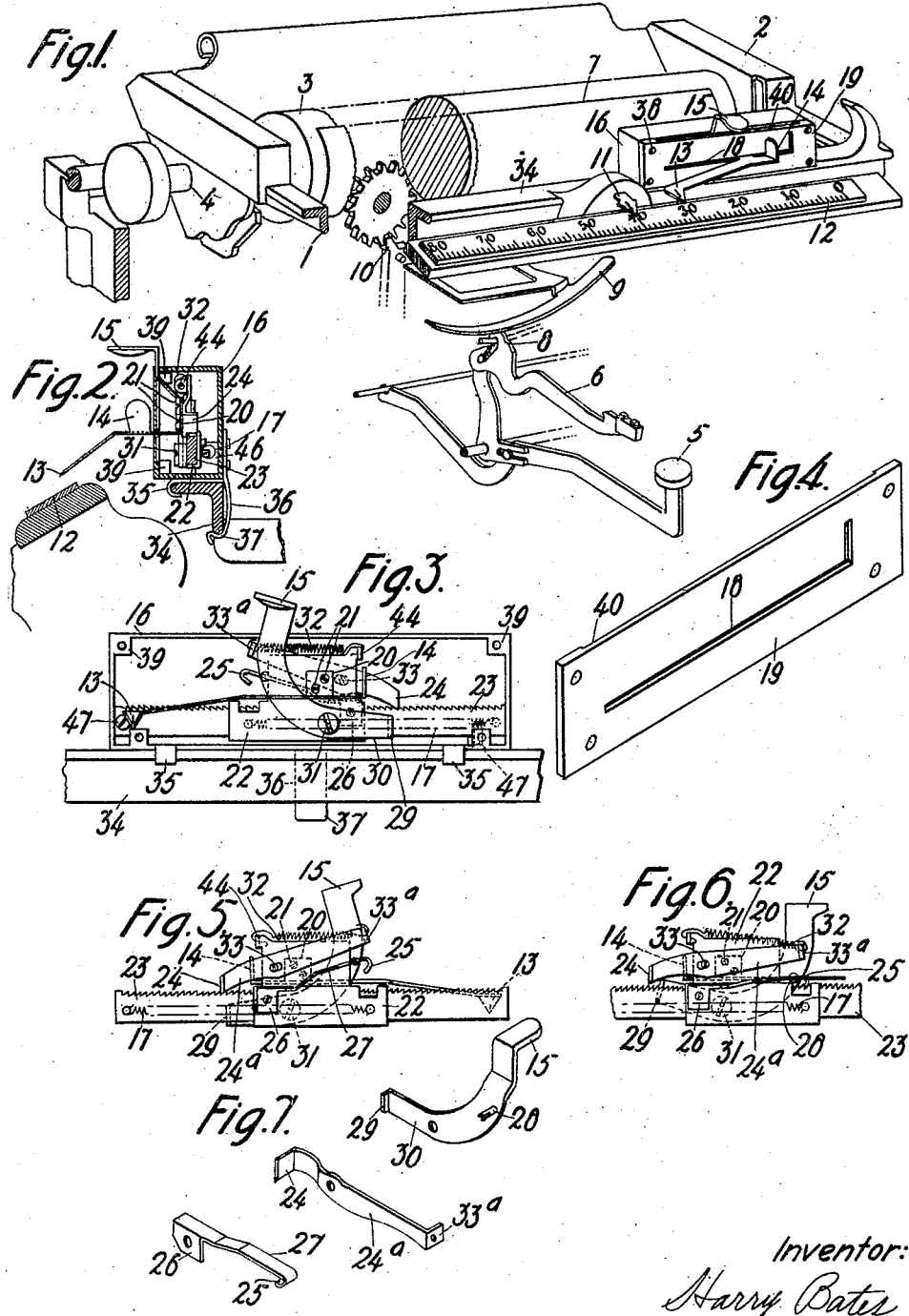

HARRY BATES, OF NEW YORK, N. Y., ASSIGNOR TO UNDERWOOD TYPEWRITER COMPANY, OF NEW YORK, N. Y., A CORPORATION OF DELAWARE.

TYPEWRITING MACHINE.

1,427,346. Specification of Letters Patent. Patented Aug. 29, 1922.

Application filed October 16, 1919. Serial No. 331,037.

*To all whom it may concern:*

Be it known that I, HARRY BATES, a citizen of the United States, residing in New York city, in the county of New York and State of New York, have invented certain new and useful Improvements in Typewriting Machines, of which the following is a specification.

This invention relates to typewriting machines, and more especially to line-centering devices. It is herein disclosed as applied to an Underwood standard typewriting machine. According to the present invention, the typewriter carriage, in addition to its usual pointer for pointing off letter-spaces, may be provided with a centering pointer adapted to co-operate with the same scale as the first pointer, and adapted to be manipulated to indicate the beginning of a line of which it is desired to have the center fall at a predetermined point.

In order to position this centering pointer, it may be slidable upon a rack bar, and may be under the tension of a spring, normally tending to draw it away from the center of the carriage. When it is desired to ascertain the point at which to begin a line, which shall have its center at the point then occupied by the usual letter-space scale, the centering pointer may be set to correspond with the usual pointer, and then a finger-piece may be actuated to "count off" the number of letter-spaces in the line which is to be centered.

The finger-piece may actuate escapement mechanism, which permits the centering pointer to be drawn along a half space at each actuation, with the result that this pointer counts off on the usual scale one-half the number of letter spaces in the line to be written, thereby indicating on the scale the point at which the line should begin. Since the load on said escapement is very light, and the wear is inconsiderable, the parts may be simple and compact.

Other features and advantages will hereinafter appear.

In the accompanying drawings,

Figure 1 is a fragmentary perspective view of an Underwood typewriting machine, showing the present invention as applied thereto, many parts being omitted or broken away.

Figure 2 is a sectional end view of the casing in which the centering pointer is carried.

Figure 3 is a front view of the casing, the pointer, the finger-piece, etc., with the cover removed.

Figure 4 is a perspective view of the cover.

Figure 5 is a view of the finger-piece, the rack bar and escapement mechanism, as seen from the side opposite to that seen in Figure 3.

Figure 6 is a view similar to Figure 5, but showing the finger-piece fully depressed.

Figure 7 is a spread perspective of the finger-piece and parts of the escapement device.

The carriage 1 comprises a shift-frame having ends 2 in which the platen 3 is journaled by its axle 4.

Whenever one of the type-keys 5 is depressed, it swings its type-bar 6 upwardly and rearwardly against the front side of the platen 3 to print upon a work-sheet 7, passed around the platen 3. As the type-bar 6 approaches the platen, a heel 8 upon it strikes the universal bar 9 and causes it to actuate the escapement mechanism 10, to feed the carriage to the left under the tension of a spring-barrel (not shown).

As the carriage 1 travels along, a pointer 11 upon it shows upon a letter-space-scale 12 the letter-space at which printing is effected at the depression of a key 5.

In order to center a line of writing equally about any space, such as the space "40", at which the pointer 11 is shown as standing, the typist sets a centering pointer 13 at the same letter-space, sliding it to the left, by pressing against a finger-piece 14 thereof.

The typist then "counts off", by actuations of the finger-piece or handle 15, the letter-spaces in the line which is to be centered, said handle projecting from the casing 16, thereby operating an escapement device which will be described later, and thus permits a spring 17 to draw the pointer 13 along to the right a half letter-space at each depression of the finger-piece 15. The point or letter-space at which the pointer 13 comes to rest, when the last letter-space of the line is counted, indicates the letter-space at which the pointer 11 is to be set, when beginning to write the line.

The pointer 13 projects outwardly through a slit 18, in the front cover 19 of the casing 16, and bends downwardly and to the left, so as to lie conveniently close to the scale 12, but preferably rides above the pointer 11. The finger-piece 14 is formed as a turned-up end of the pointer 13 adjacent the cover 19. Within the casing, a turned-up lug 20 of the pointer is held by screws 21 to a slide 22, which embraces a rack bar 23 and forms a mounting for the members of the escapement device, as well as the pointer.

Normally, the slide 22 is held against movement by a tooth 24 on a lever 24ᵃ, said tooth engaging the flat vertical face of one of the teeth of the rack 23. When the finger-piece 15 is depressed, it carries down a hooked tooth 25 on a spring-like member 27, which is fastened at 26 upon the slide 22, being enabled to carry it down because of the member 27 sliding within a slotted lug 28, which projects from the finger-piece 15. When the hooked tooth 25 engages with the vertical face of the tooth adjacent it, the tooth 24 is released almost simultaneously by a projecting lug 29, extending sideways from an extension 30 of the finger-piece 15, said extension lying along the rack bar 23, so that when the finger-piece 15 swings about its pivot 31 on the slide 22, the lug 29 lifts the tooth 24. This permits a spring 32, connected to a lug 33ᵃ on the lever 24ᵃ, to draw the lever forwardly with the tooth 24 on the pivot 33 on which the lever swings loosely, by reason of a slotted hole, with the result that when the finger-piece 15 rises, the spring 32 swings the tooth 24 downwardly, one tooth in advance of the tooth it formerly engaged. This permits the slide 22 to be drawn along the distance of one tooth by the spring 17, when the hooked tooth 25 rises out of the rack 23, the spring 17 being strong enough to overcome the spring 32. The spring-like member 27 restores the finger-piece 15 to its normal position as soon as the finger is removed therefrom.

The casing 16 may engage the usual front bar 34 of the typewriter carriage by a lug 35, at each end, adapted to engage the bar 34. It is clipped thereto by a spring clip 36, riveted to the casing 16 and having a resilient hooked end 37, adapted to catch beneath the bottom of the bar 34. The cover 19 may be held by screws 38, which pass through it and are threaded into lugs 39. To provide space for the finger-piece 15, the cover and casing may be slightly cut away at 40.

The slide 22 may be formed of a piece of sheet-metal, extending down in back of and under the rack 23 and up in front and over the top of said rack to embrace the latter, and is provided with a lug 44 to anchor the spring 32. The slide 22 is also provided with a stud 46 to which one end of the pointer-feeding spring 17 is connected, the other end of this spring being anchored to the rack bar 23.

In order to permit the slide to embrace the rack bar, the rack bar is held to lugs by screws 47, which keep it clear of the bottom of the casing.

Variations may be resorted to within the scope of the invention, and portions of the improvements may be used without others, and also there may be reversals of parts, inasmuch as it is usual in some typewriters to provide the scale on the frame and in other typewriters to provide it upon the carriage.

Having thus described my invention, I claim:

1. In a typewriting machine, the combination with a traveling platen carriage and a scale, of a pointer on the carriage adapted to indicate letter-spaces on the scale, a second pointer on the carriage adapted to indicate letter-spaces on the scale, a spring normally tending to draw said second pointer along the carriage, and an escapement device adapted to permit the second pointer to be drawn along.

2. In a typewriting machine, the combination with a traveling platen carriage and a scale, of a pointer on the carriage adapted to indicate letter-spaces on the scale, a second pointer on the carriage adapted to indicate letter-spaces on the scale, a spring normally tending to draw said second pointer along the carriage, a rack, a tooth normally holding said second pointer by said rack, a second tooth, and a finger-piece operating said teeth to permit the spring to draw the pointer along.

3. In a typewriting machine, the combination with a traveling platen carriage and a scale, of a pointer on the carriage adapted to indicate letter-spaces on the scale, a second pointer on the carriage adapted to indicate letter-spaces on the scale, a spring normally tending to draw said second pointer along the carriage, an escapement device for the carriage, an escapement device for the second pointer adapted to feed half the steps of the first escapement, and a finger-piece on the second pointer for moving it against the tension of its spring.

4. In a typewriting machine, the combination with a traveling carriage and a pointer movable thereon, of a slide for the pointer, a spring drawing on said slide, a tooth normally holding said slide, a second tooth on the slide, a finger-piece adapted to swing the first tooth to free it, and engaging the second tooth to make it effective, a spring adapted to slip the first tooth when freed, and a spring tending to restore the finger-piece and first tooth.

5. In a typewriting machine, the combination with a traveling platen carriage and a scale, of a pointer on the carriage adapted to indicate letter-spaces on the scale, a second pointer on the carriage adapted to indicate letter-spaces on the scale, a spring normally tending to draw said second pointer along the carriage, a rack, a tooth normally holding said second pointer by said rack, a second tooth, a finger-piece operating said teeth to permit the spring to draw the pointer along, and a finger-piece fast on the second pointer to enable the second pointer to be returned against the tension of its spring.

6. In a typewriting machine, the combination with a traveling platen carriage and a scale, of a pointer on the carriage adapted to indicate letter-spaces on the scale, a second pointer on the carriage adapted to indicate letter-spaces on the scale, a spring normally tending to draw said second pointer along the carriage, a rack, an escapement device slidable on the rack and carrying the second pointer, and a clip adapted to catch the rack to the carriage.

7. In a typewriting machine, the combination with a traveling platen carriage and a scale, of a pointer on the carriage adapted to indicate letter-spaces on the scale, a second pointer on the carriage adapted to indicate letter-spaces on the scale, a spring normally tending to draw said second pointer along the carriage, a rack, a slide on said rack on which the spring draws and carrying said second pointer, a tooth loosely pivoted on the slide and adapted to engage the rack, a finger-piece for disengaging the tooth from the rack, a spring anchored in said slide and adapted to draw the tooth forwardly on the slide and into engagement with the rack, a second tooth normally free of the rack, but adapted to be thrown into engagement with it by the finger-piece, and a pivot about which the finger-piece is adapted to be swung by the second tooth.

8. In a typewriting machine, the combination with a traveling platen carriage and a scale, of a pointer on the carriage adapted to indicate letter-spaces on the scale, a second pointer on the carriage adapted to indicate letter-spaces on the scale, a spring normally tending to draw said second pointer along the carriage, a casing, a cover for the casing through an opening in which the second pointer projects, an opening between the cover and casing, a finger-piece projecting through said second opening, and an escapement within the casing and operated by the finger-piece to enable the second pointer to be drawn along.

HARRY BATES.

Witnesses:
CATHERINE A. NEWELL,
EDITH B. LIBBEY.